United States Patent [19]

McArthur et al.

[11] Patent Number: 5,070,863
[45] Date of Patent: Dec. 10, 1991

[54] BACK EXERCISE APPARATUS

[75] Inventors: James A. McArthur, Coquitlam; David C. Short, Port Coquitlam, both of Canada

[73] Assignee: Baltimore Therapeutic Equipment Co., Hanover, Md.

[21] Appl. No.: 491,809

[22] Filed: Mar. 8, 1990

[51] Int. Cl.⁵ .................. A61H 1/02; A63B 21/00
[52] U.S. Cl. .................. 128/25 R; 272/129; 272/134; 272/144; 272/DIG. 4
[58] Field of Search .............. 272/129, 130, 134, 144, 272/DIG. 4; 128/25 R

[56] References Cited

U.S. PATENT DOCUMENTS

| | | | |
|---|---|---|---|
| 4,462,252 | 7/1984 | Smidt et al. | 272/134 X |
| 4,637,607 | 1/1987 | McArthur | 272/129 X |
| 4,725,055 | 2/1988 | Skowronski | 272/134 |
| 4,727,860 | 3/1988 | McIntyre | 128/25 R |
| 4,732,381 | 3/1988 | Skowronski | 272/134 |
| 4,753,126 | 6/1988 | Sammaratano | 272/134 X |
| 4,802,462 | 2/1989 | Reiss et al. | 272/134 X |
| 4,836,536 | 6/1989 | Jones | 272/134 |
| 4,902,009 | 2/1990 | Jones | 272/118 X |

Primary Examiner—Robert Bahr
Attorney, Agent, or Firm—James J. Brown

[57] ABSTRACT

Back exercise apparatus has a seat and a footrest, with a first backrest pivotable about a horizontal first axis for biasing the upper portion of a person on the seat about the first axis, and a second backrest pivotable about a vertical second axis for biasing the upper portion of the person about the second axis. A gearbox selectively connects a drive to either backrest and has an input shaft connected to the drive, a pair of output shafts parallel to the input shaft and a selector for connecting the input shaft to a selected one of the output shafts for rotating the selected output shaft in either direction of rotation.

10 Claims, 5 Drawing Sheets

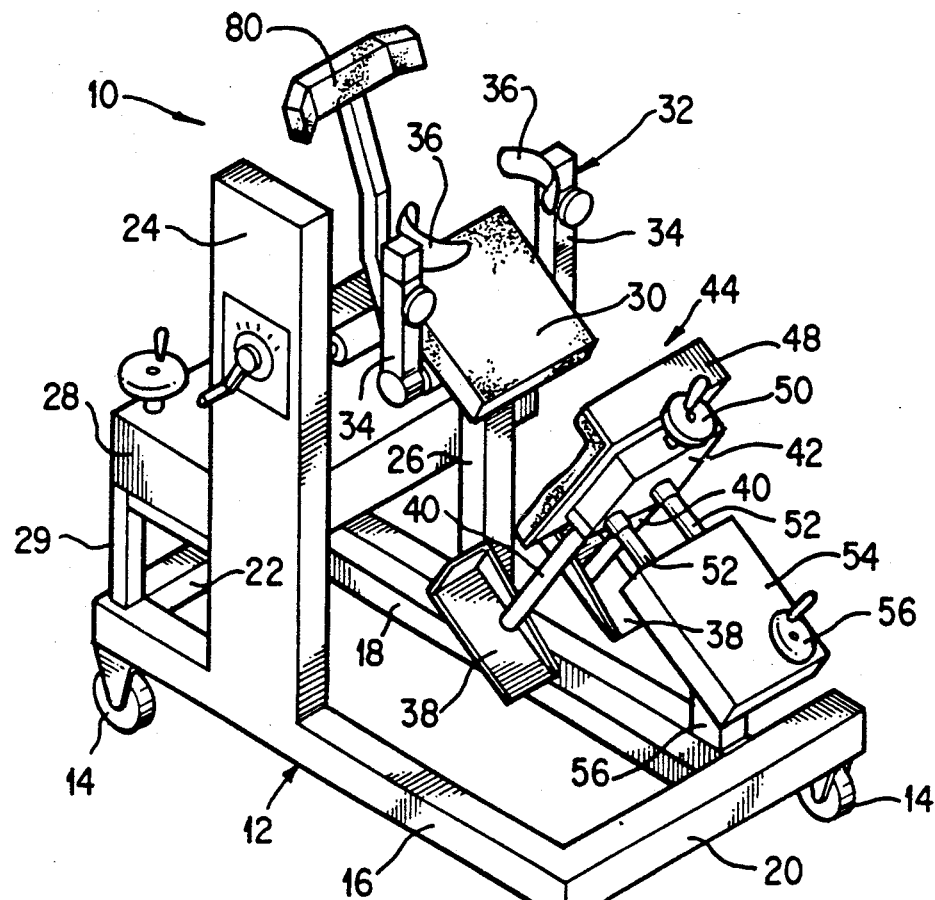
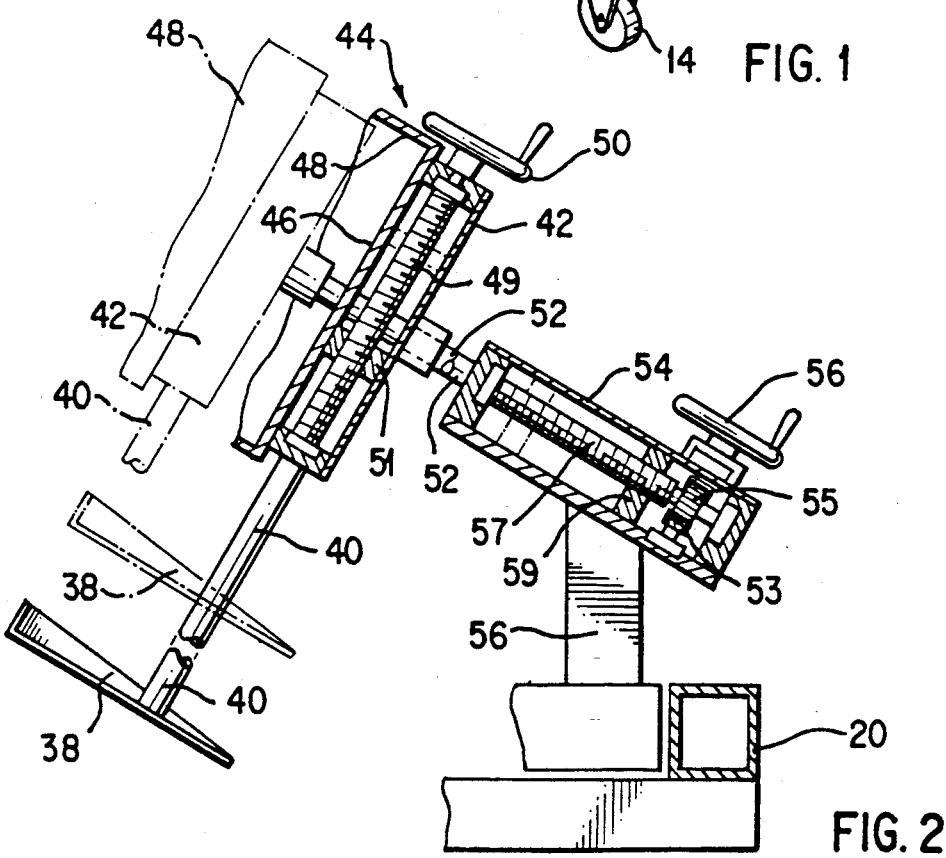

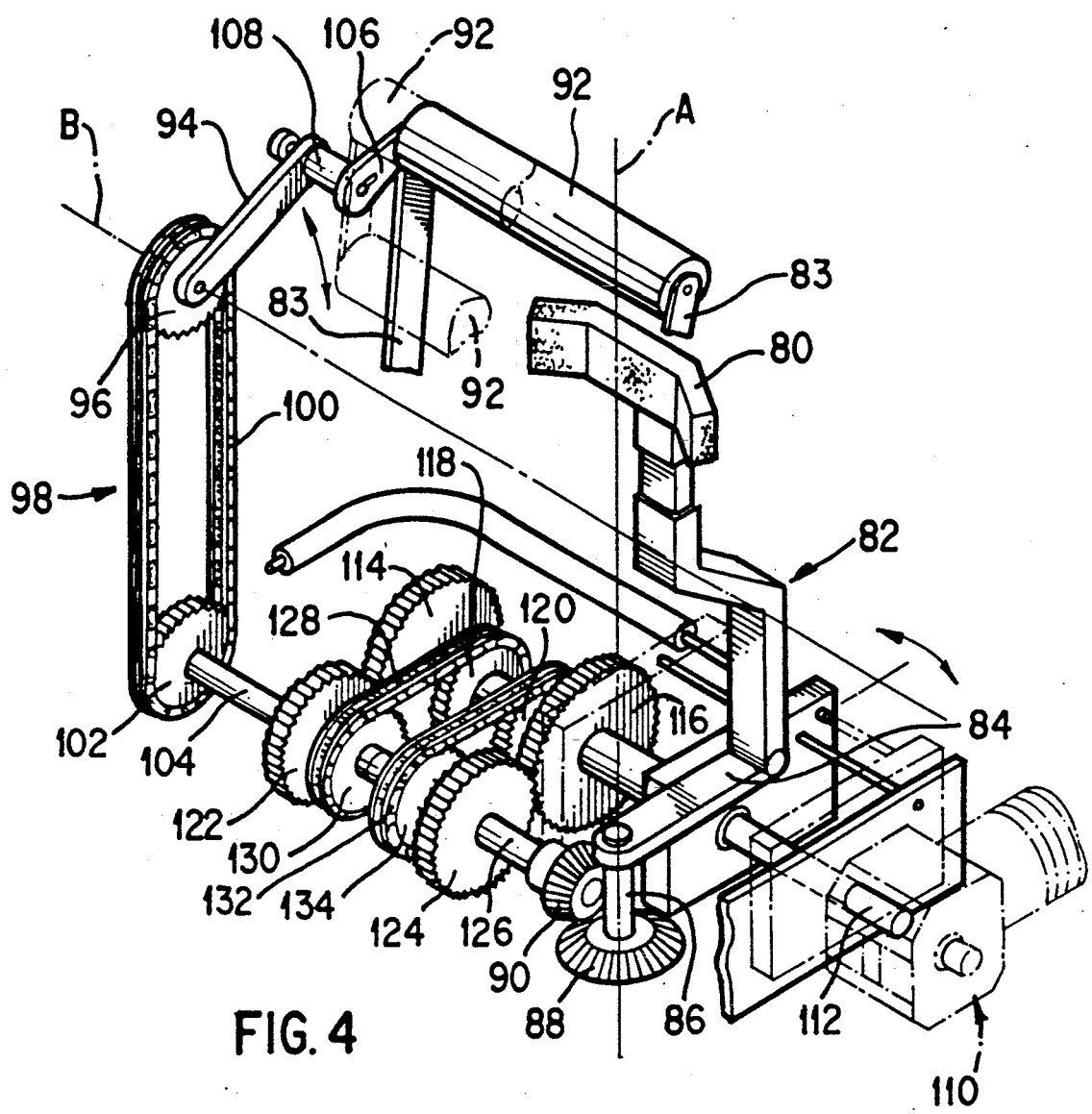
FIG. 4
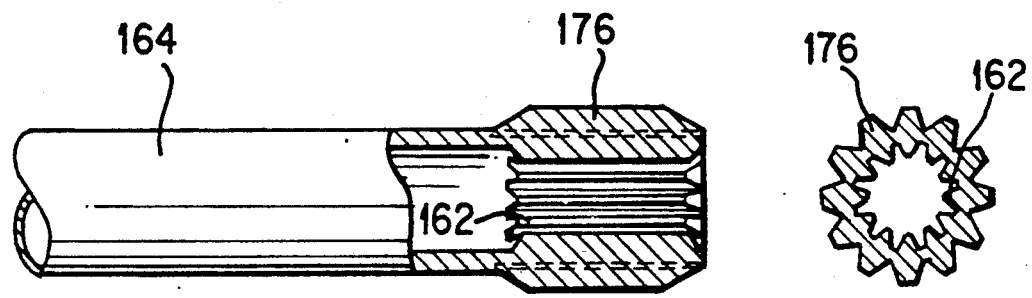
FIG. 6
FIG. 7

BACK EXERCISE APPARATUS

FIELD OF THE INVENTION

The present invention relates to a back exercise apparatus and, more particularly, to an apparatus by means of which forces can be applied to a patient seated on the apparatus for exercising the back of the patient.

BACKGROUND OF THE INVENTION

In U.S. Pat. No. 4,637,607, issued Jan. 20, 1978 to James McArthur, there is diclosed an apparatus which is commercially available under the trade mark DYNA-TRAC and which comprises a prime mover connected to the input of a frictional transmission, the output of which can be connected to various different patient exercise apparatuses for exercising various limbs and body parts of a patient. Such exercising may be for the purpose of testing the patient or for rehabilitation.

There is also commercially available a back exercising apparatus having a seat and a footrest for supporting a patient in a seated position, and force applying means for applying forces to the upper portion of the patient's body about a horizontal axis and about a vertical axis to thereby perform so-called flexion and extension and rotation testing and exercising of the patient's back.

BRIEF SUMMARY OF THE INVENTION

It is an object of the present invention to provide, in a back exercise apparatus of the above-described type, a novel and improved gearbox arrangement for selectively transmitting drive from the drive means to the force applying means.

According to the present invention, back exercise apparatus for applying forces to a human body to exercise the back comprises a seat for supporting the person, a footrest for supporting the feet of the person, means for restraining the person in position relative to the seat and the footseat, first force applying means pivotable about a horizontal first axis for biasing the upper portion of the person about the first axis, and second force applying means pivotable about a vertical second axis for biasing the upper portion of the person about the second axis. A drive supplies biasing forces to bias the first and second force applying means for movement about the first and second axes, respectively, and a gearbox is provided for selectively connecting the drive to either of the first and second force applying means. The gearbox comprises an input shaft connected to the drive, a pair of mutually axially aligned output shafts parallel to the input shaft, first and second gear pairs for transmitting drive from the input shaft to the output shafts for rotating the latter in a first direction, and first and second sprocket and chain drives for transmitting drive from the input shaft to the output shafts for rotating the latter in a second direction opposite from the first direction. Any of the gear pairs or the sprocket and chain drives can be selected, one at a time, so as to drive a corresponding one of the output shafts in a corresponding direction of rotation. The rotation of the first and second output shafts is transmitted to the first and second force applying means, respectively.

In a perferred embodiment of the invention, the input shaft is formed with external splines, and the gearbox includes a sleeve co-axially slidable on the input shaft and formed with internal splines in engagement with the external splines of the input shaft. Two pairs of hub members are co-axial with the input shaft and are supported for rotation about the input shaft. The first and second gear pair drive transmission means and include a gear carried by a respective one of the hub members, and the first and second sprocket and chain transmissions each include a sprocket carried on a respective one of the hub members. The hub members are each formed with internal splines, and the sleeve has an external spline formation which can be engaged with the internal splines of any one of the hub members to provide a drive connection between the input shaft and the respective drive transmission. Thus, by sliding the sleeve along the input shaft, the drive can be transmitted from the input shaft in either direction to either of the output shafts.

BRIEF DESCRIPTION OF THE DRAWINGS

Further features, objects and advantages of the present invention will be more readily apparent from the following description thereof when taken in conjunction of the accompanying drawings, in which:

FIG. 1 shows a view in perspective of a back exercise apparatus embodying the present invention;

FIG. 2 shows a side view, partially broken away, of components of a footrest and adjustable knee retaining mechanism forming part of the apparatus of FIG. 1;

FIG. 4 shows a view in perspective of a gearbox for selectively transmitting drive to different parts of the apparatus of FIG. 1;

FIGS. 6 and 7 show a broken-away view in side elevation and a view in transverse cross-section, respectively, of a splined sleeve forming part of the gearbox of FIGS. 4 and 5;

DESCRIPTION OF THE PREFERRED EMBODIMENT

Figure 3:
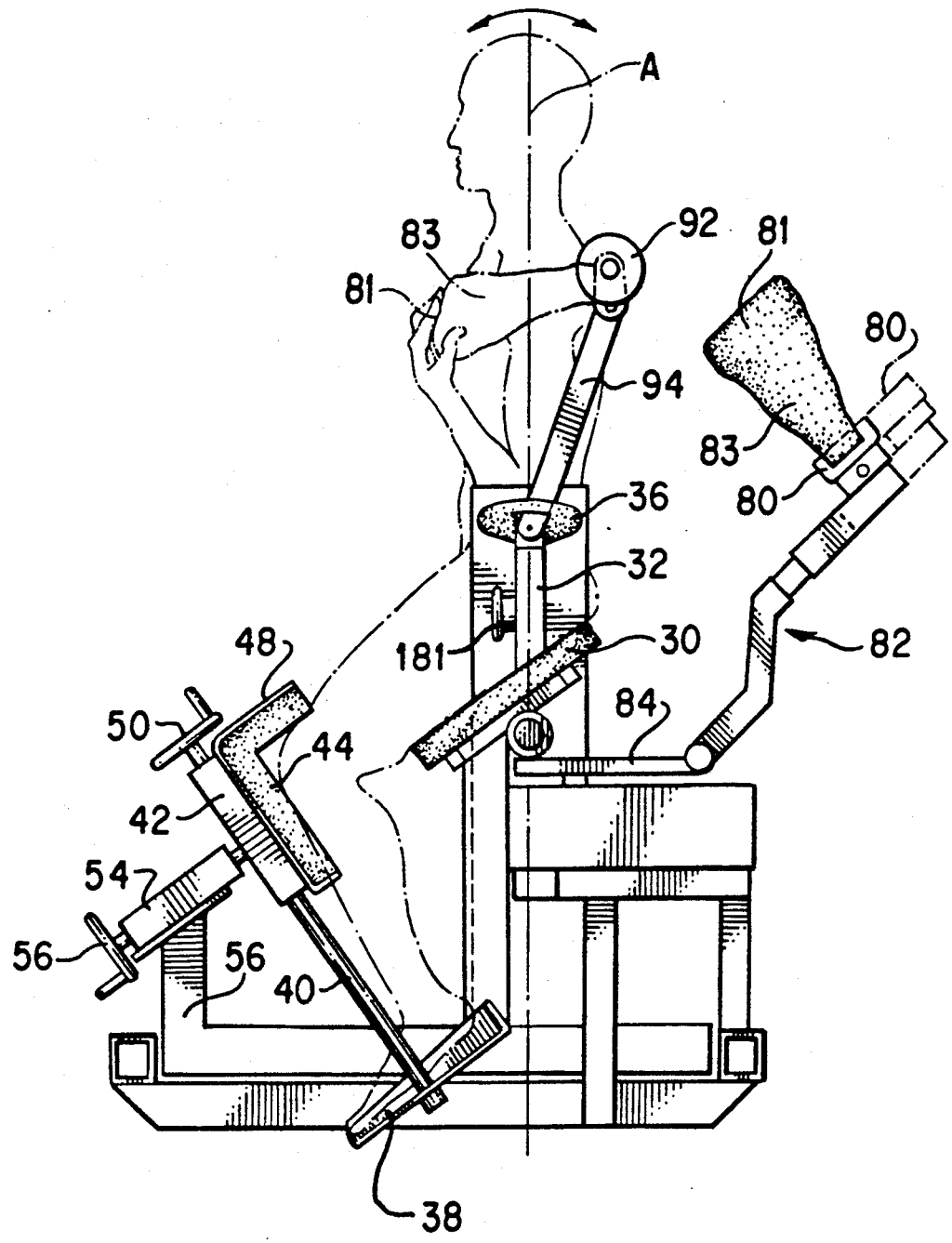
FIG. 3 shows a view in side elevation of the apparatus of FIG. 1, with a patient sealed thereon.

The back exercise apparatus shown in FIG. 1 and indicated generally by reference numeral 10 has a horizontal frame indicated generally by reference numeral 12, which is supported on four casters 14, of which only three are shown. The frame 12 comprises parallel horizontal side beams 16 and 18, which are connected at opposite ends by transverse end beams 20 and 22.

A pair of uprights 24 and 26 extend upwardly from the beams 16 and 18, and a gearbox housing 28 is mounted on the uprights 24 and 26 and a further pair of uprights, of which only one is shown and indicated by reference numeral 29 and which are provided at the rear ends of the beams 16 and 18.

A seat 30 is mounted on a hip locking assembly indicated generally by reference numeral 32.

The hip locking assembly 32 comprises a pair of uprights 34, each carrying at its upper end a concave hip pad 36 for gripping engagement for the hips of a patient seated on the seat 30, the uprights 34 being adjustable towards and away from one another for displacing the hip pads 36 against and away from the patient's hips.

The back exercise apparatus 10 also has a pair of footrests 38, which are carried at the lower ends of rods 40, extending downwardly from a housing 42.

The housing 42 also carries a knee pad indicated generally by reference numeral 44, which has a rearwardly facing lower portion 46 serving as a shin support for supporting the fronts of the knees and the shins of the patients seated on the seat 30, and a downwardly facing upper portion 48 adapted to extend over the top of the knees of the patient to act as a knee countersupport for restraining the knees against upward movement. The location of the footrests 38 relative to the kneepad 44 can be adjusted, by rotation of an adjustment wheel 50, to adapt the apparatus to patient of different sizes. For this purpose, the wheel 50 is connected to a threaded shaft 49, which is rotatably mounted in the housing, and which is in threaded engagement with a slide member 51 in sliding contact with the housing 42. Rotation of the wheel 50 displaces the slide member 51, and therewith the rods 40, in the axial direction of the shaft 49.

The housing 42, together with the footrests 38 and the kneepad 44, is carried on a pair of rods 52 which project from a housing 54 carried on an upright 56 extending upwardly from the side beam 18. The housing 54 is provided with an adjustment wheel 56 for extending and retracting the rods 52 relative to the housing 54, to thereby adjust the apparatus correspondingly to the size of the patient. Through a bevel gear and pinion 53, 55, the wheel 56 rotates a threaded shaft 57, to displace along the shaft 57 a slide block 59, which is in threaded engagement with the shaft 57 and connected to the rods 52.

When the patient is seated on the seat 30, force can be applied to the patient in two different ways.

Firstly, by means of a backrest 80 (FIG. 3), against which the back of the patient is held by means of a chest pad 81 secured by straps 83 to opposite ends of the backrest 80, the upper portion of the patient can be biased or urged about a vertical axis A by rotation of the backrest 80 about the axis A.

More particularly, as shown in FIGS. 3 and 4 the backrest 80 is mounted on the upper end of a support arm indicated generally by reference numeral 82 which, in turn, is mounted at the outer end of horizontal arm 84.

A vertical shaft 86 carries, at its lower end, a bevel gear 88 and, at its upper end, a horizontal arm 84, so that when the bevel gear 88 is driven by a bevel gear 90, as described in greater detail below, the shaft 86 and, consequently, the arm 84 and 82 and the backrest 80 are likewise rotated about the axis A.

The upper portion of the patient's body can also be biased about a horizontal axis, indicated by reference numeral B, so as to perform flexion and extension of the patient's back. For this purpose, instead of being securing in the above-described manner to the backrest 80, the patient is instead secured in a similar manner by the chest pad 81, as shown in broken lines in FIG. 3, to a backrest 92. The latter is carried on the outer end of an arm 94, the inner end of which is secured to a sprocket 96 forming part of a chain and sprocket drive transmission indicated generally by 98, which includes a chain 100 and a lower sprocket 102 carried on an output shaft 104.

As can be seen in FIG. 4, the backrest 92 is mounted on a pivotable arm 106 which, in turn, is mounted on the pivot shaft 108 extending from the outer end of the arm 94. This arrangement allows adjustment of the backrest 92 about the axis of the pivot arm 108 for adjusting the apparatus to the size of the patient.

As will be apparent from the above description of FIGS. 1 to 3, the backrest 80 and 92 form force applying means for applying bias forces to the upper body portion of the patient for effecting flexion and extension of the patients's back, by means of the backrest 92, or rotation of the patient's back, by means of the backrest 80.

The drive for effecting these movements of the patient is obtained from a drive mechanism indicated generally by reference numeral 110, which is a drive mechanism such as that disclosed in the aforesaid U.S. Pat. No. 4,637,607, the disclosure of which is incorporated herein by reference.

This drive is transmitted from the drive mechanism 110 to an input shaft 112.

The input shaft 112 can be selectively connected, in a manner described in detail below, to either one of two gear wheels 114, 116, or either one of two sprockets 118, 120.

The gear wheel 114 meshes with a gear wheel 122 mounted on and fixed to the output shaft 104, and the gear wheel 116 meshes with a gear wheel 124, which is mounted on and fixed to a second output shaft 126. The bevel gear 90 is carried on and driven by the output shaft 126.

The sprocket 118 is connected by a chain 128 to a sprocket 130 carried on and fixed to the output shaft 104, and the sprocket 120 is connected by a chain 132 to a sprocket 134 carried on and fixed to the output shaft 126.

It will be apparent, therefore, that when the input shaft 112 is connected to the gear wheel 114, the output shaft 104, and thus the backrest 92, will be rotated in one direction, whereas they will be rotated in the opposite direction when the input shaft 112 is connected to the sprocket 118.

Likewise, when the input shaft 112 is connected to the gear 116, will be rotated in one direction through the output shaft 126, whereas it will be rotated in the opposite direction when the output shaft 112 is connected to the sprocket 120.

Figure 5:
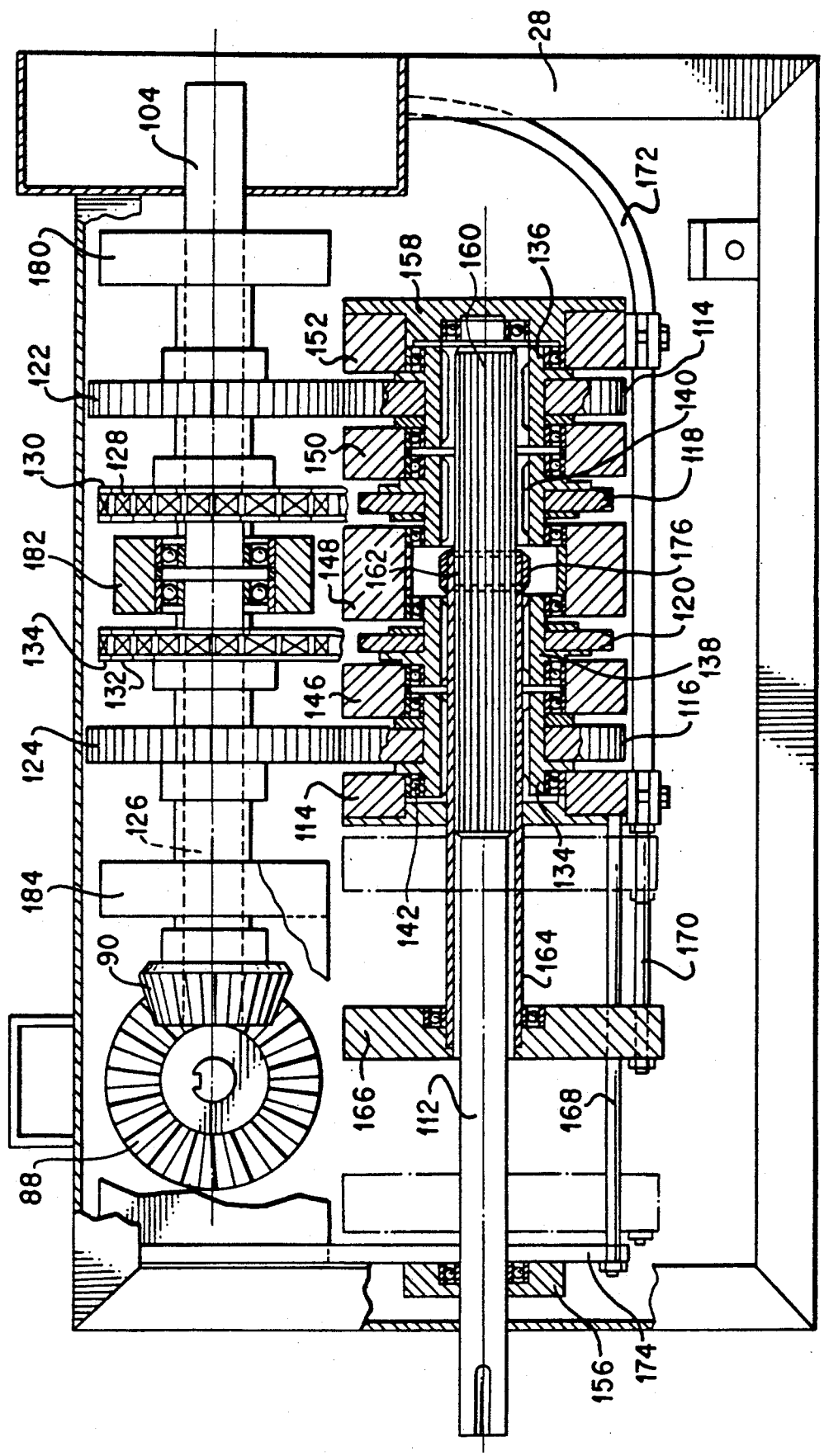
FIG. 5 shows a plan view of the gearbox of FIG. 3, in a housing.

Referring now to FIG. 5, it will be seen that the gears 116 and 114 are carried on respective hub members 134 and 136, while the sprockets 120 and 118 are carried on respective hub members 138 and 140.

The hub members 134, 136, 138 and 140 are rotatably mounted, by means of ball bearings 142, in support blocks 144, 146, 148, 150 and 152, which are fixedly mounted within the housing 28.

Also, the hub members 134, 136, 138 and 140 are each formed with internal splines 154.

The input shaft 112 is journalled in a support block 156 adjacent one end therof and, at its opposite end, in a support block 158 mounted on the block 152. Also, the input shaft 112 is formed with external splines 160 extending along a portion of the length of the shaft 112 substantially co-extensive with the assembly of the hub members 134, 136 138 and 140 and the support blocks 144, 146, 148, 150 and 152. These external splines 160 on the input shaft 112 slidably engage internal splines 162 formed on a sleeve 164, which is co-axially slidably along the input shaft 112.

The left-hand end of the sleeve 164, as viewed in FIG. 5, is rotatably secured to a slide block 166, which is slidable to and fro along a guide rod 168 extending parallel to the input shaft 112. This to and fro sliding movement is effected by means of an actuating rod 170 connected between the slide block 166 and a Bowden cable 172.

Opposite ends of the guide rod 168 are fixedly mounted in the support block 144 and in a support plate 174.

The right-hand end of the sleeve 164, as viewed in FIG. 4, is formed with an external spline formation 176, which is selectively engageable with the splines 154 of any one of the hub members 134, 136, 138 and 140, depending on the position of the slide block 166 on the guide rod 168. As shown in FIG. 5, the spline formation 176 is located in a neutral position, in an axial gap between the hub members 138 and 140. When, however, the spline formation 176 is engaged with any of the hub members, then a drive connection is thereby provided between the input shaft 112 and the corresponding one of the two gear wheels 116 and 114 or the two sprockets 118 and 120, through the splines 160 and 162, the sleeve 164, the spline formation 176 and the splines 154.

To facilitate the engagement of the spline formation 176 with the splines of the hub members, these hub member splines are specially shaped, as shown in FIGS. A through 11.

Figure 8:
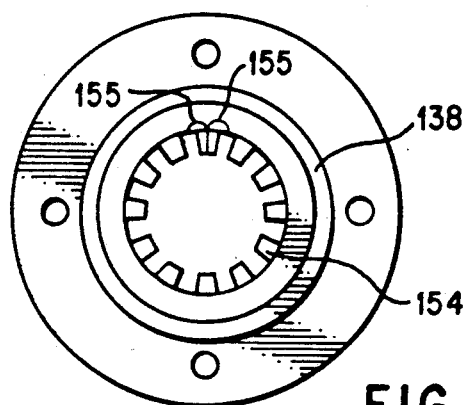
FIGS. 8 and 9 show views in end elevation and axial cross-section, respectively, of a hub member forming part of the gearbox of FIGS. 4 and 5.
Figure 9:
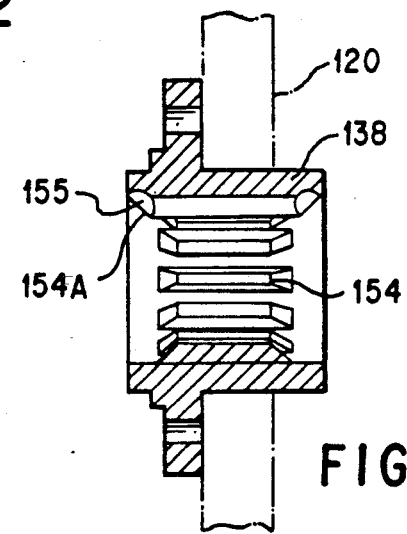
Figure 10:
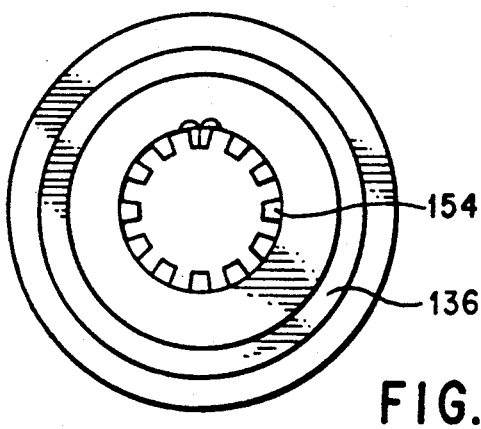
FIGS. 10 and 11 show views corresponding to those of FIGS. 6 and 7 but of another hub member of the gearbox.

Referring firstly to FIGS. 8 and 9, which show by way of example the hub member 138, it will be seen that the opposite ends of each of the splines 154 are machined away except for one spline, which is indicated by reference numeral 154A. The opposite ends of the spline 154A are formed, at opposite sides, with recesses 155, so as to present axially inclined, tapered ends 157.

The splines 154 of the hub members 134 and 140 are similar to those of the hub member 138.

Figure 11:
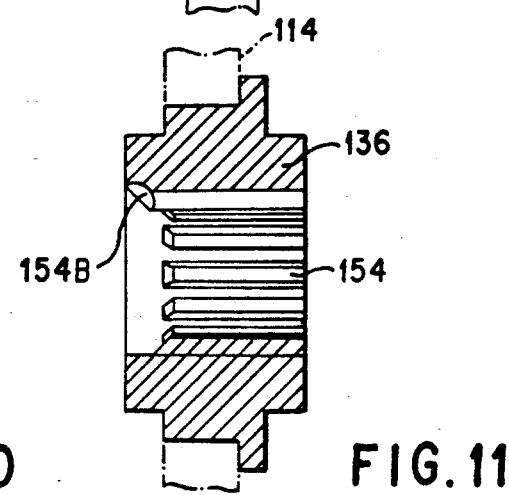

The hub member 136, however, which receives the spline formation 176 from only one end of its splines 154, has the latter cut away at only at that one end thereof, as shown in FIG. 11. In this case, one spline, indicated by reference numeral 154B, is left longer than the remainder but has one end shaped, similarly to the ends of the spline 154A, as an axially inclined, tapered end 154B.

As also shown in FIG. 5, the co-axial output shafts 104 and 126 are journalled in support blocks 180, 182 and 184.

The chain and sprocket drive transmission 98, shown in FIG. 3, is accommodated within the upright 24.

Figure 12:
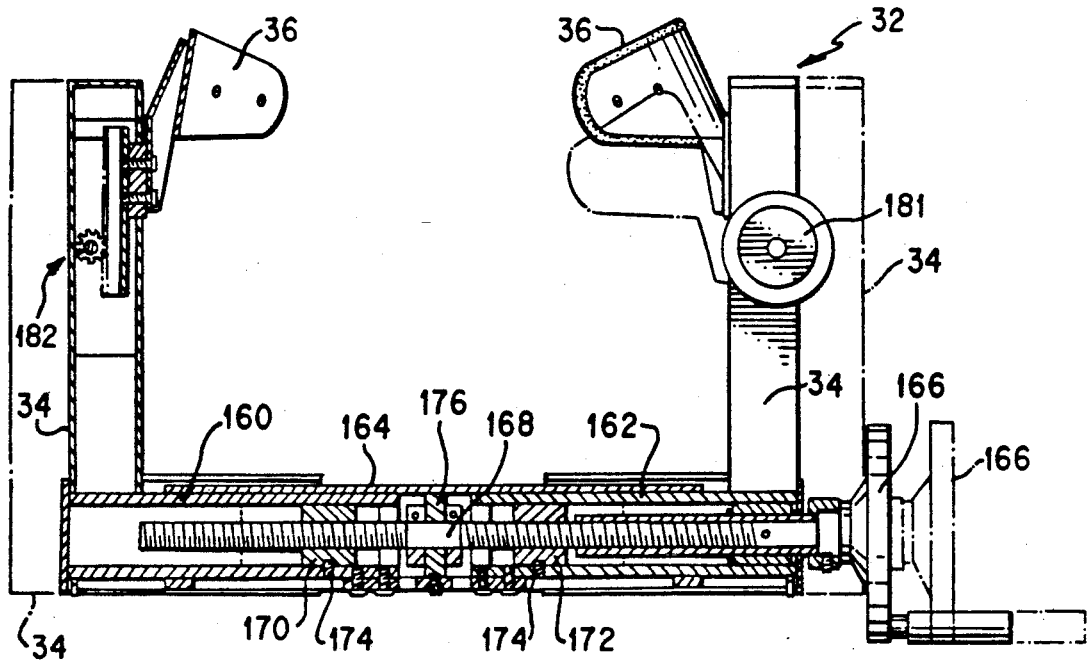
FIG. 12 shows a front view, mostly broken away in cross-section, of a hip locking device of the apparatus of FIG. 1.

FIG. 12 shows a view in transverse cross-section through the hip locking device 32.

As shown in FIG. 12, the uprights 34 are secured to respective tubes 160, 162, which are coaxially slidable within and supported by a common outer tube 164.

An adjustment wheel 166 is connected to a shaft 168, which has opposite threads in threaded engagement with respective nuts 170 and 172 which, in turn, are fixedly secured by grub screws 174 to the tubes 160 and 162, respectively. The shaft 168 is rotatably mounted in a block 176 secured to the outer tube 164. On rotation of the adjustment wheel 166, and, therewith, the shaft 168, the nuts 170 and 172 are displaced axially of the shaft 168 and the uprights 34 in opposite directions, and the hip pads 36 are thus moved horizontally closer together or further apart depending, of course, on the direction of rotation of the adjustment wheel 166.

Each of the hip pads 36 is vertically adjustable, relative to its respective upright 34, by means of an adjustment wheel 181 and a respective worm and pinion drive mechanism indicated generally by reference numeral 182.

We claim:

1. Back exercise apparatus for applying forces to a human body to exercise the back, comprising:
   a seat for supporting a person, said seat having a longitudinal centerline;
   footrest means for supporting the feet of the person;
   knee countersupport means spaced from said footrest means for overlying engagement with the patient's knees to retain the patient's legs against displacement upwardly from said footrest means,
   first force applying means pivotable about a horizontal first axis for biasing the upper portion of the person about said first axis;
   second force applying means pivotable about a vertical second axis for biasing the upper portion of the person about said second axis;
   the vertical plane containing the longitudinal centerline of said seat passing through at least a portion of said second force applying means; and
   motor driven drive means for supplying biasing forces to said first and second force applying means to bias said first and second force applying means for movement about said first and second axes, respectively.

2. Back exercise apparatus as claimed in claim 1, including shin support means for engagement with the patient's shins, said knee countersupport means extending rearwardly of said shin support means for receiving the shins and knees of the patient in a location beneath said knee countersupport means.

3. Back exercise apparatus as claimed in claim 2, wherein said shin support means and said knee countersupport means comprise first and second pads, respectively, extending at an angle to one another.

4. Back exercise apparatus as claimed in claim 3, further comprising means for adjusting the spacing of said knee countersupport means from said footrest means, whereby the apparatus is adjustable to patients of various sizes.

5. Back exercise apparatus for applying forces to a human body to exercise the back, comprising:
   a seat for supporting a person;
   footrest means for supporting the feet of the person;
   means for restraining the person in position relative to said seat and said footrest means;
   first force applying means pivotable about a horizontal first axis for biasing the upper portion of the person about said first axis;
   second force applying means pivotable about a vertical second axis for biasing the upper portion of the person about said second axis;
   drive means for supplying biasing forces to said first and second force applying means to bias said first and second force applying means for movement about said first and second axes, respectively; and
   gearbox means for selectively connecting said drive means to either of said first and second force applying means,
   said gearbox means comprising:
   an input shaft connected to said drive means;
   a pair of mutually axially aligned output shafts parallel to said input shaft;

means for selectively connecting said input shaft to a selected one of said output shafts for rotating said selected output shaft in either direction of rotation; and means for transmitting rotations of said first and second output shafts to said first and second force applying means, respectively.

6. Back exercise apparatus as claimed in claim 5, wherein said selective connection means comprise:

first and second gear pair drive transmission means for transmitting drive from said input shaft to said output shafts for rotating the latter in a first direction;

first and second sprocket and chain drive transmission means for transmitting drive from said input shaft to said output shafts for rotating the latter in a second direction opposite from said first direction; and selector means for selectively rendering any of said drive transmission means operable, one at a time, so as to drive a corresponding one of said output shafts in a corresponding direction of rotation.

7. Back exercise apparatus as claimed in claim 6, wherein said input shaft has external splines, said gearbox means further comprising:

two pairs of hub members co-axial with said input shaft; and means supporting said hub members for rotation about said input shaft;

said first and second gear pair drive transmission means each comprising a gear carried by a respective one of said hub members and said first and second sprocket and chain transmissions each comprising a sprocket carried on a respective one of said hub members;

said hub members each being formed with internal splines; and said selection means comprising a sleeve co-axially slidable on said input shaft and formed with internal splines in engagement with said input shaft external splines;

an external spline formation on said sleeve; and means for selectively engaging said sleeve external spline formation with said internal splines of any one at a time of said hub members to provide a drive transmitting connection between said input shaft and the respective one of said drive transmissions.

8. Back exercise apparatus back exercise apparatus for applying forces to a human body to exercise the back, comprising:

a seat for supporting a person;

footrest means for supporting the feet of the person;

knee countersupport means spaced from said footrest means for overlying engagement with the patient's knees to retain the patient's legs against displacement upwardly from said footrest means, first force applying means pivotable about a horizontal first axis for biasing the upper portion of the person about said first axis;

second force applying means pivotable about a vertical second axis for biasing the upper portion of the person about said second axis;

drive means for supplying biasing forces to said first and second force applying means to bias said first and second force applying means for movement about said first and second axes, respectively;

gearbox means for selectively connecting said drive means to either of said first and second force applying means, said gearbox means comprising:

an input shaft connected to said drive means;

a pair of mutually axially aligned output shafts parallel to said input shaft;

means for selectively connecting said input shaft to a selected one of said output shafts for rotating said selected output shaft in either direction of rotation; and means for transmitting rotations of said first and second output shafts to said first and second force applying means, respectively.

9. Back exercise apparatus as claimed in claim 8, wherein said selective connection means comprise:

first and second gear pair drive transmission means for transmitting drive from said input shaft to said output shafts for rotating the latter in a first direction;

first and second sprocket and chain drive transmission means for transmitting drive from said input shaft to said output shafts for rotating the latter in a second direction opposite from said first direction; and selector means for selectively rendering any of said drive transmission means operable, one at a time, so as to drive a corresponding one of said output shafts in a corresponding direction of rotation.

10. Back exercise apparatus as claimed in claim 9, wherein said input shaft has external splines, said gearbox means further comprising:

two pairs of hub members co-axial with said input shaft; and means supporting said hub members for rotation about said input shaft;

said first and second gear pair drive transmission means each comprising a gear carried by a respective one of said hub members and said first and second sprocket and chain transmissions each comprising a sprocket carried on a respective one of said hub members; and said hub members each being formed with internal splines; and said selection means comprising a sleeve co-axially slidable on said input shaft and formed with internal splines in engagement with said input shaft external splines;

an external spline formation on said sleeve; and means for selectively engaging said sleeve external spline formation with said internal splines of any one at a time of said hub members to provide a drive transmitting connection between said input shaft and the respective one of said drive transmissions.

* * * * *